United States Patent
Kawamura

(10) Patent No.: US 12,084,282 B2
(45) Date of Patent: Sep. 10, 2024

(54) ARTICLE STORAGE FACILITY

(71) Applicant: Daifuku Co., Ltd., Osaka (JP)

(72) Inventor: Shinsuke Kawamura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 299 days.

(21) Appl. No.: 17/856,143

(22) Filed: Jul. 1, 2022

(65) Prior Publication Data

US 2023/0008343 A1    Jan. 12, 2023

(30) Foreign Application Priority Data

Jul. 8, 2021    (JP) ................................ 2021-113661

(51) Int. Cl.
*B65G 1/16*    (2006.01)
*B65G 1/04*    (2006.01)

(52) U.S. Cl.
CPC ............ *B65G 1/16* (2013.01); *B65G 1/0492* (2013.01)

(58) Field of Classification Search
CPC ...... B65G 1/0492; B65G 1/0407; B65G 1/02; H01L 21/67769
See application file for complete search history.

(56) References Cited

U.S. PATENT DOCUMENTS

| | | | | |
|---|---|---|---|---|
| 5,525,106 | A | * | 6/1996 | Iizuka ................... F24F 3/167 55/385.2 |
| 2016/0152412 | A1 | * | 6/2016 | Abe ................. H01L 21/67288 414/277 |
| 2016/0332815 | A1 | | 11/2016 | Ueda et al. |
| 2018/0072498 | A1 | * | 3/2018 | Abe .......................... B60L 9/00 |
| 2020/0048001 | A1 | * | 2/2020 | Kawamura ....... H01L 21/67769 |
| 2021/0131125 | A1 | * | 5/2021 | Kusama ........... H01L 21/67769 |
| 2021/0253339 | A1 | * | 8/2021 | Veenman ............... B65D 88/54 |

FOREIGN PATENT DOCUMENTS

| JP | 2016124687 A | | 7/2016 | |
|---|---|---|---|---|
| JP | 2018039654 A | * | 3/2018 | ............... B60L 9/00 |

\* cited by examiner

*Primary Examiner* — Kaitlin S Joerger
(74) *Attorney, Agent, or Firm* — The Webb Law Firm

(57) ABSTRACT

Two transport units are provided with a partition device. The partition device includes a partition body, a partition body guide mechanism, and a movement assist mechanism. The movement assist mechanism includes a cable body and a cable body guide mechanism. A coupling portion is coupled to an upper portion of the partition body. A grip portion is provided on the cable body spaced apart from the coupling portion. The cable body guide mechanism includes a guide body. The cable body extends along a curved extending direction along the guide body. A portion of the cable body on the coupling portion side relative to the guide body extends along a width direction on a protruding side in the width direction relative to the guide body, and a portion of the cable body on the grip portion side relative to the guide body extends along an up-down direction below the guide body.

6 Claims, 6 Drawing Sheets

Fig.5
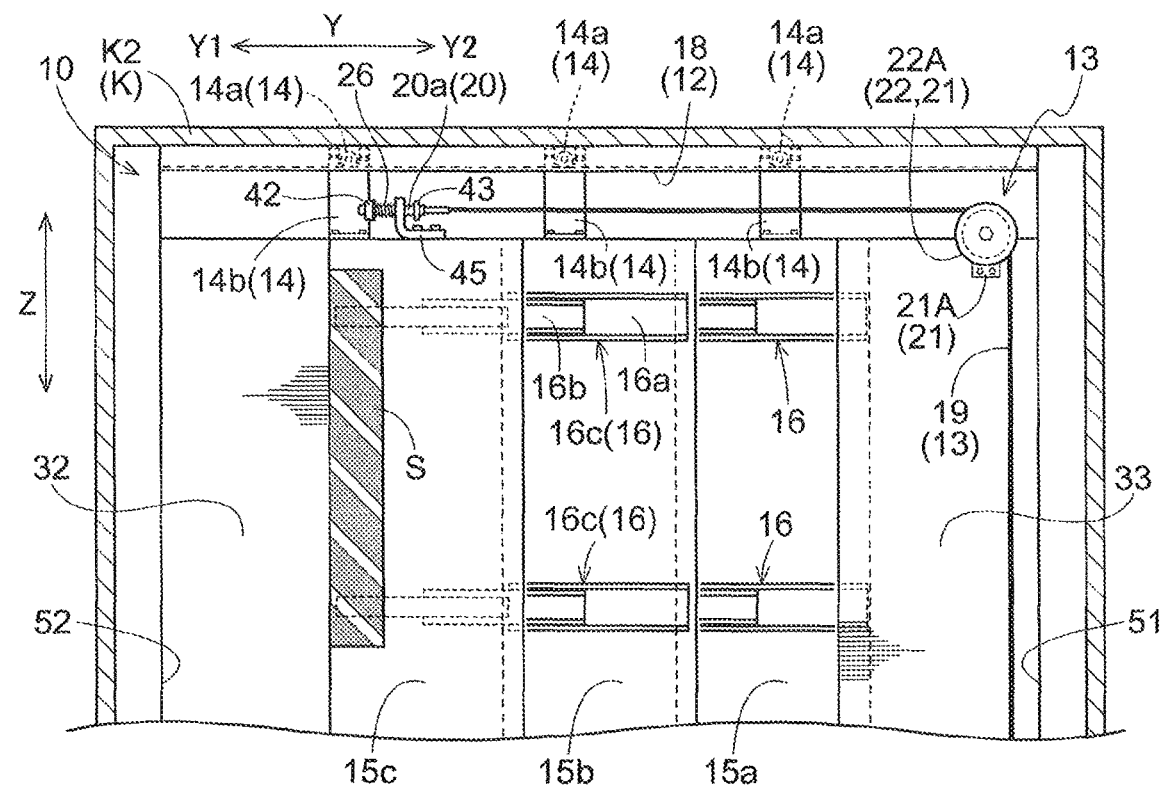
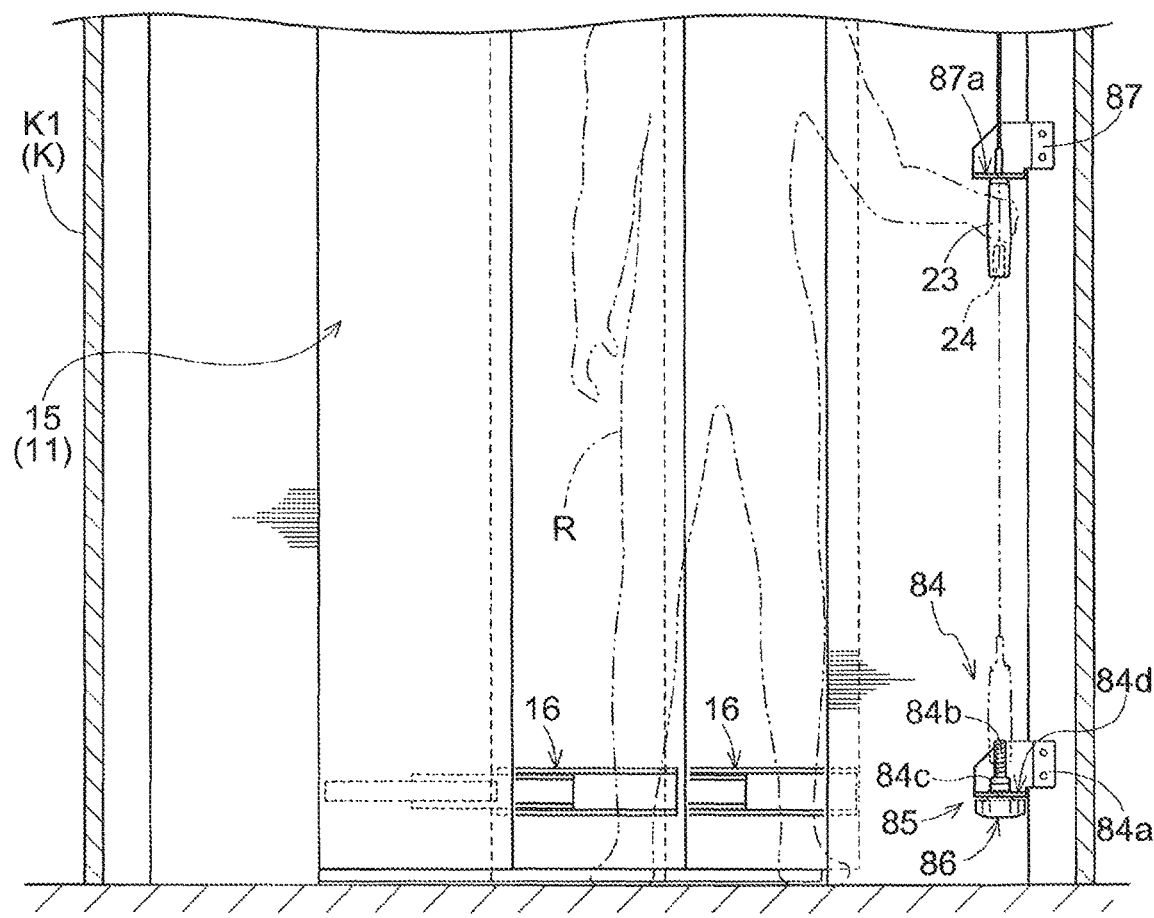

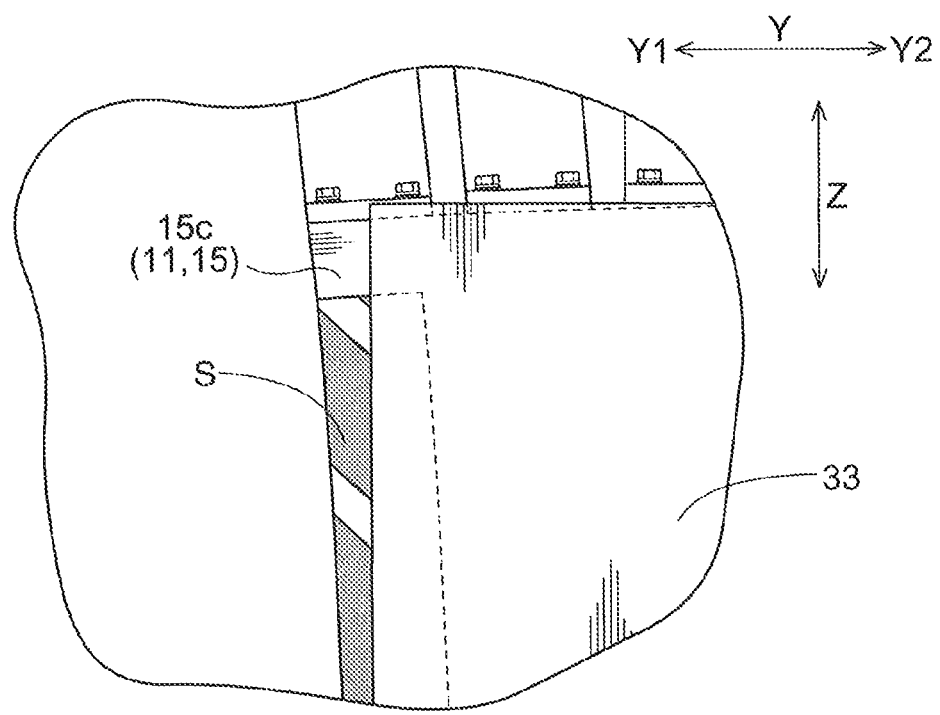

ately from the aisle irrespective of the dimension of
the partition body in the up-down direction when retracting
the partition body from the aisle to the retracted position.

An article storage facility according to the present disclosure including: a pair of storage racks disposed on opposite sides of an aisle; and a transport device configured to move along the aisle and transport an article, wherein the transport device includes two transport units, each of the two transport units includes: a cart configured to travel along a traveling path set along the aisle; a support fixed to the cart; an elevation body configured to ascend and descend along the support; and a transfer device supported by the elevation body and configured to hold the article and transfer the article to the storage racks, the article storage facility further includes a partition device configured to partition the aisle, at a prescribed position in an intermediate portion of the traveling path, the partition device includes: a partition body configured to slide along a width direction to move to a protruding position at which the partition body protrudes into the aisle and a retracted position at which the partition body is retracted from the aisle, the width direction being a direction orthogonal to, when viewed in an up-down direction, a path direction extending along the traveling path; a partition body guide mechanism configured to support the partition body and guide the sliding movement of the partition body; and a movement assist mechanism configured to assist the sliding movement of the partition body, the partition body includes, in an upper portion, a guided portion configured to be guided by the partition body guide mechanism in the width direction, the movement assist mechanism includes: a cable body; and a cable body guide mechanism configured to guide the cable body, the cable body includes a coupling portion coupled to the upper portion of the partition body, the cable body further includes a grip portion to be gripped by a worker, at a position on the cable body spaced apart from the coupling portion, the cable body guide mechanism includes a guide body at a fixed position relative to the partition body guide mechanism, the cable body extends along an extending direction that is curved along the guide body, a portion of the cable body that is on a coupling portion side relative to the guide body extending along the width direction on a protruding side in the width direction relative to the guide body, and a portion of the cable body that is on a grip portion side relative to the guide body extending along the up-down direction below the guide body, the protruding side in the width direction being a side toward which the partition body moves when moving from the retracted position toward the protruding position, and the grip portion is in an operation capable range both while the partition body is at the protruding position and while the partition body is at the retracted position, the operation capable range being a range of height reachable by a hand of the worker.

According to this configuration, the article storage facility includes the partition device including the partition body whose position changes between the protruding position at which the partition body protrudes into the aisle and the retracted position at which the partition body is retracted from the aisle. Accordingly, when the partition body is at the protruding position, the aisle can be partitioned at the prescribed position to independently operate the transport units in respective spaces or independently perform maintenance operations or the like in the respective spaces. Also, when the partition body is at the retracted position, a single transport unit can travel past the prescribed position.

In this partition device, the guided portion that is guided by the partition body guide mechanism in the width direction is provided in the upper portion of the partition body. Accordingly, even when the worker or the like operates a lower portion of the partition body to slide the partition body toward a retracting side in the width direction and bring the partition body to the retracted position, there may be cases where the upper portion of the partition body is positioned on the protruding side in the width direction relative to the lower portion due to the partition body warping or inclining, for example. In such a case, the upper portion of the partition body may protrude toward the aisle and the entire partition body may not be appropriately retracted to the retracted position. Such a situation is likely to occur particularly when the partition body has a large length in the up-down direction.

According to this configuration, when moving the partition body to the retracted position, the worker can pull the upper portion of the partition body, to which the coupling portion of the cable body is coupled, toward the retracting side in the width direction by pulling the grip portion downward. Therefore, the entire partition body can be appropriately retracted from the aisle irrespective of the length of the partition body in the up-down direction. Moreover, the grip portion is in the operation capable range both while the partition body is at the retracted position and while the partition body is at the protruding position, and therefore, the worker can easily operate the grip portion.

As described above, according to this configuration, when moving the partition body to the retracted position at which the partition body is retracted from the aisle, it is possible to appropriately retract the entire partition body from the aisle irrespective of the length of the partition body in the up-down direction.

BRIEF DESCRIPTION OF THE DRAWINGS

FIG. 5 is an enlarged view of a main portion of the partition device when the partition body is at the protruding position.
FIG. 6 is an enlarged view of a portion of the partition device when a portion of a display region is protruding toward an aisle.

DETAILED DESCRIPTION OF PREFERRED EMBODIMENTS

1. Overall Summary of Article Storage Facility

Figure 1:
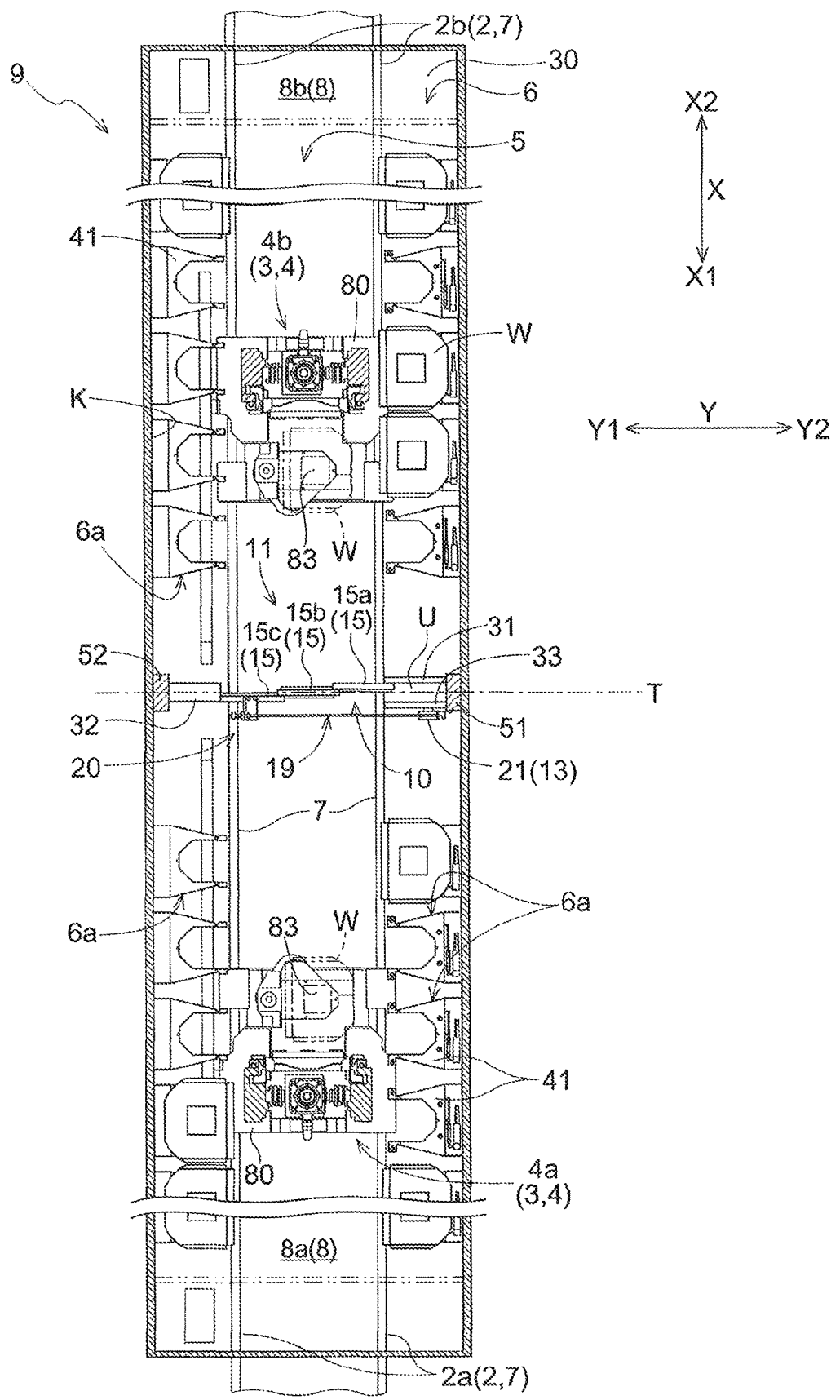
FIG. 1 is an overall plan view of an article storage facility.

The following describes an embodiment of an article storage facility based on the drawings. As shown in FIG. 1, an article storage facility 9 includes a pair of storage racks 6 disposed on opposite sides of an aisle 5 and a transport device 3 that moves along the aisle and transports articles W. Each of the pair of storage racks 6 includes a plurality storage sections 6a that store articles W. The transport device 3 moves along the aisle 5 in front of each storage rack 6 and transports articles W to or from the storage sections 6a. In the present embodiment, the article storage facility 9 also includes a wall body K surrounding the side periphery of an installation space 30 of the pair of storage racks 6. In the following description, a direction extending along a traveling path 2 of a cart 80 included in the transport device 3 will be referred to as a "path direction X", and a direction orthogonal to the path direction X when viewed in an up-down direction Z will be referred to as a "width direction Y". Also, one side in the path direction X will be referred to as a "first side X1 in the path direction", and the other side in the path direction X will be referred to as a "second side X2 in the path direction". Likewise, one side in the width direction will be referred to as a "first side Y1 in the width direction", and the other side in the width direction will be referred to as a "second side Y2 in the width direction".

2. Storage Rack

Figure 2:
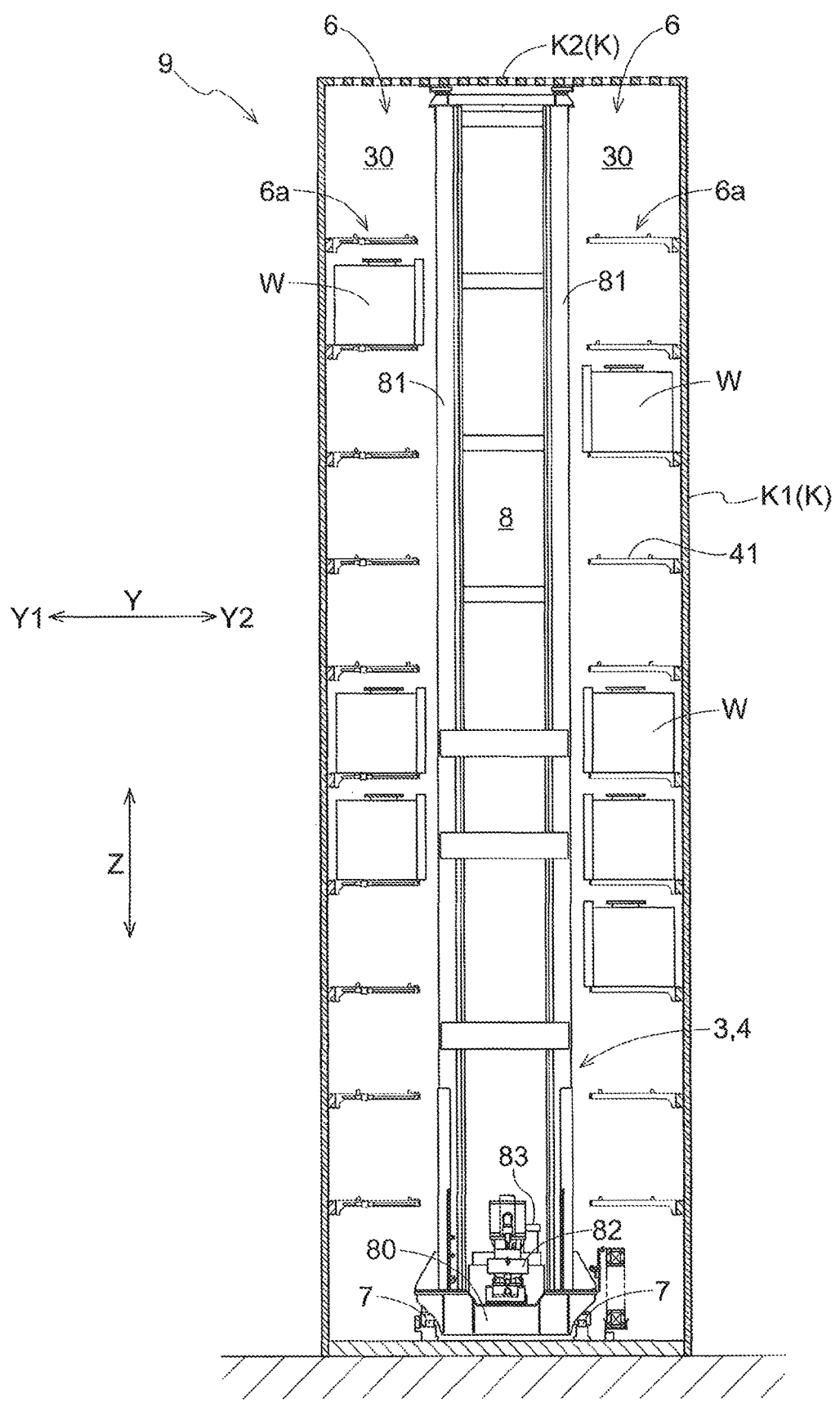
FIG. 2 is a side view of the article storage facility.

The pair of storage racks 6 are respectively provided on opposite sides in the width direction Y relative to the aisle 5. The pair of storage racks 6 face each other in the width direction Y. Specifically, as shown in FIG. 1, the storage racks 6 are installed in such an orientation that the front side (where articles W are placed into or taken out from the storage sections 6a) of each storage rack 6 is on the aisle 5 side. Accordingly, the front sides of the pair of storage racks 6 face each other in the width direction Y. As shown in FIGS. 1 and 2, each of the pair of storage racks 6 includes the plurality of storage sections 6a arranged in the up-down direction Z and the path direction X. In the present embodiment, each of the plurality of storage sections 6a includes a placement body 41 for placing and supporting a stored article W. In this example, the articles W are FOUPs (Front Opening Unified Pods) in which semiconductor substrates are stored. Also, in this example, the pair of storage racks 6 are provided with an inactive gas supply device (not shown) that supplies an inactive gas such as nitrogen gas to the articles W stored in the storage sections 6a.

3. Wall Body

As shown in FIGS. 1 and 2, the wall body K is installed to separate the installation space 30 in which the pair of storage racks 6 are installed and an internal space 8 in which the transport device 3 moves, from an external space.

The side periphery of the internal space 8 is surrounded by a non-porous side wall portion K1 of the wall body K. The ceiling of the internal space 8 is covered by a porous ceiling wall portion K2 to allow clean air to flow into the internal space 8 from the ceiling side. Also, a gas discharge portion (not shown) for discharging gas from the internal space 8 to the outside is provided in a lower portion of the wall body K. Accordingly, clean air enters the internal space 8 from the ceiling wall portion K2 of the wall body K and flows through the internal space 8 downward from the ceiling side. The clean air that has flowed from the upper side toward the lower side is discharged from the gas discharge portion to the outside of the internal space 8 together with an inactive gas discharged from the articles W stored in the storage sections 6a.

4. Transport Device

As shown in FIG. 1, the transport device 3 includes two transport units 4. Each of the two transport units 4 moves along the path direction X and transports articles W. Specifically, each of the two transport units 4 moves along the aisle 5 extending along the path direction X to transport articles W. In the present embodiment, each of the two transport units 4 receives an article W from one of the plurality of storage sections 6a arranged on both sides of the aisle 5 in the width direction Y, and transports the article W to a carry-out port for transporting articles W to the outside of the storage racks 6. Also, each of the two transport units 4 receives an article W from a carry-in port for transporting articles W from the outside of the storage racks 6, and transports the article W to one of the plurality of storage sections 6a. In this example, the two transport units 4 are constituted by a first transport unit 4a disposed on the first side X1 in the path direction and a second transport unit 4b disposed on the second side X2 in the path direction. The first transport unit 4a and the second transport unit 4b move along the path direction X at the same position in the width direction Y by being guided by common rails 7 installed along the aisle 5. Accordingly, the positional relationship between the first transport unit 4a and the second transport unit 4b in the path direction X is never reversed, and the first transport unit 4a is always on the first side X1 in the path direction relative to the second transport unit 4b. In the illustrated example, each of the two transport units 4 (the first transport unit 4a, the second transport unit 4b) is a stacker crane.

As shown in FIGS. 1 and 2, each of the two transport units 4 includes the cart 80 that travels along the traveling path 2 set along the aisle 5, supports 81 that are fixed on the cart 80, an elevation body 82 that ascends and descends along the supports 81, and a transfer device 83 that is supported by the elevation body 82, holds an article W, and transfers the article W to the storage racks 6.

Each cart 80 travels along the traveling path 2 between the pair of storage racks 6 while being guided by the rails 7. In other words, the cart 80 travels in the path direction X along the traveling path 2 in the aisle 5 while being guided by the rails 7. In the present embodiment, the rails 7 include a pair of rail members spaced apart from each other in the width direction Y. The cart 80 travels along the traveling path 2 while being guided by the pair of rails 7. In this example, the cart 80 of the first transport unit 4a and the cart 80 of the second transport unit 4b travel along the same traveling path 2 independently of each other while being guided by the common pair of rails 7.

Each transfer device 83 is capable of transferring an article W to any storage rack 6 disposed on either side in the width direction Y relative to the aisle 5. More specifically, the transfer device 83 is capable of transferring an article W between a transfer target position such as a storage section 6a in the storage rack 6 and the transfer device 83. Transfer target positions for the transfer device 83 also include, for example, the carry-in port for transporting articles W from the outside of the storage racks 6 and the carry-out port for transporting articles W to the outside of the storage racks 6, in addition to the storage sections 6a. In this example, the transfer device 83 is a slide fork-type transfer device that includes a fork capable of advancing and retracting in the width direction Y.

With this configuration, each of the first transport unit 4a and the second transport unit 4b can receive an article W from the carry-in port (not shown) and transport the article W to any storage section 6a of the storage racks 6. Also, each of the first transport unit 4a and the second transport unit 4b can take out an article W stored in any storage section 6a and transfer the article W to the carry-out port (not shown).

5. Partition Device

The article storage facility 9 also includes a partition device 10 configured to partition the aisle 5 for the two transport units 4. That is, the partition device 10 configured to partition the aisle 5 is provided at a prescribed position T in an intermediate portion of the traveling path 2. The partition device 10 is capable of dividing the traveling path 2 as well as the internal space 8 by partitioning the aisle 5 at the prescribed position T. As shown in FIG. 1, in the present embodiment, the single prescribed position T is set in center portions of the pair of storage racks 6 in the path direction X. In the illustrated example, the internal space 8 and the traveling path 2 are divided into two spaces and two paths, respectively, in a state where the aisle 5 is partitioned along the width direction Y. Specifically, the internal space 8 is divided into a first internal space 8a on the first side X1 in the path direction and a second internal space 8b on the second side X2 in the path direction as a result of the aisle 5 being partitioned. Likewise, the traveling path 2 is divided into a first traveling path 2a on the first side X1 in the path direction and a second traveling path 2b on the second side X2 in the path direction as a result of the aisle 5 being partitioned. Therefore, in the state where the aisle 5 is partitioned, the first transport unit 4a travels along the first traveling path 2a in the first internal space 8a, and does not travel along the second traveling path 2b in the second internal space 8b. The first transport unit 4a transports articles W inside the first internal space 8a. Likewise, the second transport unit 4b travels along the second traveling path 2b in the second internal space 8b, and does not travel along the first traveling path 2a in the first internal space 8a. The second transport unit 4b transports articles W inside the second internal space 8b.

Figure 3:
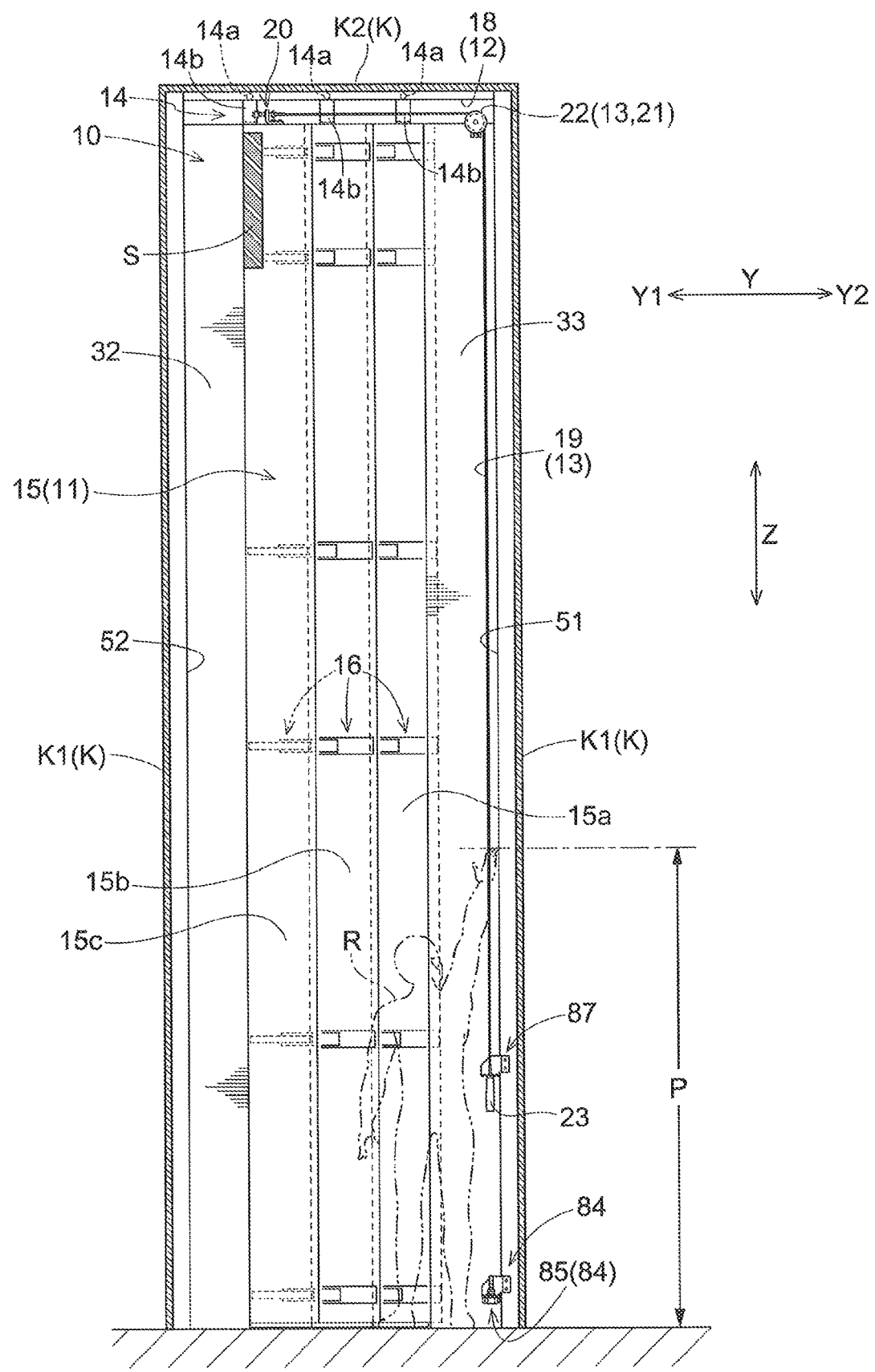
FIG. 3 is a front view of a partition device when a partition body is at a protruding position.
Figure 4:
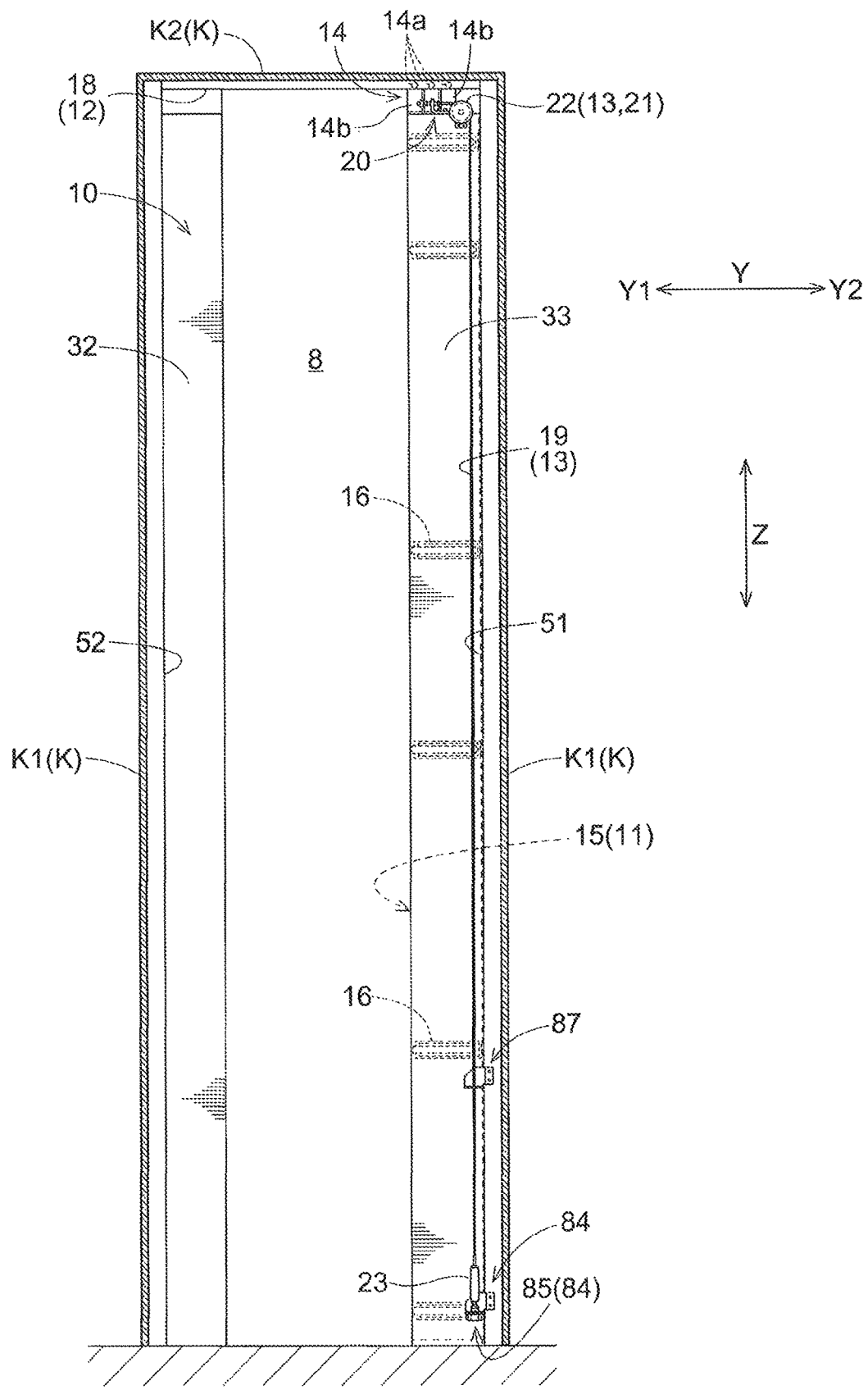
FIG. 4 is a front view of the partition device when the partition body is at a retracted position.

As shown in FIGS. 3 and 4, the partition device 10 includes a partition body 11 that slides along the width direction Y to change its position between a protruding position at which the partition body 11 protrudes into the aisle 5 and a retracted position at which the partition body 11 is retracted from the aisle 5, a partition body guide mechanism 12 that supports the partition body 11 and guides the sliding movement of the partition body 11, and a movement assist mechanism 13 that assists the sliding movement of the partition body 11. When the partition body 11 is at the protruding position, the aisle 5 is partitioned at the prescribed position T in the path direction X (see FIG. 1). When the partition body 11 is at the retracted position, the aisle 5 is continuous at the prescribed position T as well. Accordingly, when the partition body 11 is at the retracted position, the first transport unit 4a is allowed to move toward the second side X2 in the path direction past the prescribed position T. Likewise, when the partition body 11 is at the retracted position, the second transport unit 4b is allowed to move toward the first side X1 in the path direction past the prescribed position T. In the present embodiment, the partition body 11 changes its position from the retracted position to the protruding position by sliding toward the first side Y1 in the width direction, and changes its position from the protruding position to the retracted position by sliding toward the second side Y2 in the width direction. Accordingly, the first side Y1 in the width direction corresponds to a "protruding side in the width direction" toward which the partition body 11 moves when moving from the retracted position toward the protruding position. Also, the second side Y2 in the width direction corresponds to a "retracting side in the width direction".

In the present embodiment, the partition body 11 includes a plurality of plate-like door members 15 as shown in FIGS. 2 and 3. In the present embodiment, each of the door members 15 is disposed along the up-down direction Z and the width direction Y. When viewed in the path direction X, each door member 15 has a rectangular plate-like shape and the length of the door member 15 in the up-down direction Z is longer than its length in the width direction Y. In this example, the plurality of door members 15 have the same shape and the same size. Also, in this example, the partition body 11 is constituted by three door members 15.

As shown in FIGS. 1, 3, and 4, in the present embodiment, the plurality of door members 15 are disposed in parallel to each other and guided by the partition body guide mechanism 12 in such a manner as to be capable of sliding at respective positions shifted from each other in the path direction X. In the illustrated example, each of the three door members 15 (a first door member 15a, a second door member 15b, a third door member 15c) is disposed in parallel to the width direction Y. Also, the three door members 15 are arranged at respective positions shifted from each other in the path direction X, and respectively slide along different paths in the width direction Y. Each of the three door members 15 is supported by the partition body guide mechanism 12 from above and guided in the width direction Y by the partition body guide mechanism 12. In this example, the three door members 15 are arranged in the order of the first door member 15a, the second door member 15b, and the third door member 15c from the second side X2 in the path direction.

As shown in FIGS. 3, 4, and 5, in the present embodiment, the plurality of door members 15 are coupled to each other via linear motion guide mechanisms 16 in such a manner as to be movable relative to each other in the width direction Y. Here, each pair of door members 15 adjacent to each other in the path direction X are coupled to each other via a linear motion guide mechanism 16. Specifically, the first door member 15a and the second door member 15b are coupled to each other via a linear motion guide mechanism 16. Also, the second door member 15b and the third door member 15c are coupled to each other via a linear motion guide mechanism 16. Here, each linear motion guide mechanism 16 is disposed between mutually facing surfaces of the pair of door members 15 adjacent to each other in the path direction X. In this example, the linear motion guide mechanisms 16 are linear guides. As shown in FIG. 5, a guide rail 16a of each linear motion guide mechanism 16 is attached to one of the pair of door members 15 so as to extend in the width direction Y, and a slider portion 16b that is guided by the guide rail 16a is attached to the other of the pair of door members 15. As shown in FIG. 3, in the present embodiment, each of the three door members 15 is provided with a plurality of linear motion guide mechanisms 16 extending along the width direction Y. More specifically, six linear motion guide mechanisms 16 are provided on each of the mutually facing surfaces of the first door member 15a and the second door member 15b. Likewise, six linear motion guide mechanisms 16 are provided on each of the mutually facing surfaces of the second door member 15b and the third door member 15c. Note that the number of linear motion guide mechanisms 16 coupling the pair of door members 15 adjacent to each other in the path direction X is not limited to six, and an appropriate number of linear motion guide mechanisms 16 can be provided as necessary.

As shown in FIGS. 3 and 4, in the present embodiment, while the partition body 11 is at the protruding position, the plurality of door members 15 overlap each other in the width direction Y a smaller amount than while the partition body 11 is at the retracted position. The overlapping amount of the plurality of door members 15 in the width direction Y is the maximum while the partition body 11 is at the retracted position as shown in FIG. 4. On the other hand, the overlapping amount of the plurality of door members 15 in the width direction Y is the minimum while the partition body 11 is at the protruding position as shown in FIGS. 1 and 3. In the present embodiment, at the retracted position, the three door members 15 (the first door member 15a, the second door member 15b, and the third door member 15c) are disposed in a second side Y2 end region in the width direction of a range across which the door members 15 are slidable. In this example, at the retracted position, the three door members 15 are disposed in such a manner that the entire door members 15 overlap each other in the width direction Y when viewed in the path direction X (see FIG. 4). Furthermore, in this example, at the retracted position, the three door members 15 are disposed in such a manner that the entire door members 15 overlap a first fixed wall 31 and a third fixed wall 33, which will be described later, in the width direction Y when viewed in the path direction X. The overlapping amount of the three door members 15 in the width direction Y gradually decreases as the door members 15 slide from the retracted position toward the first side Y1 in the width direction. At the protruding position, the three door members 15 completely partition the aisle 5, and the overlapping amount of the door members 15 in the width direction Y becomes the minimum. In this example, at the protruding position, the three door members 15 are disposed in such a manner that end portions of the door members 15 in the width direction Y overlap each other when viewed in the path direction X (see FIGS. 1 and 3). Thus, the three door members 15 are arranged in the width direction Y in the order of the first door member 15a, the second door member 15b, and the third door member 15c from the second side Y2 in the width direction.

Here, out of the plurality of door members 15 constituting the partition body 11, when a door member 15 to which attention is directed is referred to as a "target door member" and a door member 15 that is on the first side Y1 in the width direction (protruding side in the width direction) relative to the target door member when the partition body 11 is at the protruding position is referred to as a "protruding side door member", the partition body 11 in the present embodiment includes a restriction mechanism 16c that prevents the target door member from moving toward the first side Y1 in the width direction (protruding side in the width direction) relative to the protruding side door member. That is, each of the plurality of door members 15 is prevented from moving toward the first side Y1 in the width direction relative to the protruding side door member by the restriction mechanism 16c. In the present embodiment, the restriction mechanism 16c is configured using a member that restricts a movable range of the slider portion 16b relative to the guide rail 16a in the linear motion guide mechanism 16 described above. Note that the restriction mechanism 16c is not limited to the linear motion guide mechanism 16 and may also be configured by providing a stopper or the like between the mutually facing surfaces of the pair of door members 15 adjacent to each other in the path direction X. In this example, when the first door member 15a is the target door member, the second door member 15b and the third door member 15c each correspond to the protruding side door member, and when the second door member 15b is the target door member, the third door member 15c corresponds to the protruding side door member. Accordingly, movement of the first door member 15a toward the first side Y1 in the width direction relative to the second door member 15b and the third door member 15c is restricted. Also, movement of the second door member 15b toward the first side Y1 in the width direction relative to the third door member 15c is restricted.

As shown in FIGS. 3, 4, and 5, guided portions 14 that are guided by the partition body guide mechanism 12 in the width direction Y are provided in an upper portion of the partition body 11. With this configuration, the partition body 11 can slide in the width direction Y. In the present embodiment, the guided portions 14 are respectively provided in upper portions of the plurality of door members 15 constituting the partition body 11. The partition body guide mechanism 12 is disposed above the partition body 11. Accordingly, the partition body guide mechanism 12 supports the plurality of door members 15 by suspending the door members 15 from above via the guided portions 14. When a worker R pushes or pulls any of the plurality of door members 15 constituting the partition body 11 in the width direction Y, the guided portions 14 slide in the width direction Y together with the door members 15.

In the present embodiment, each guided portion 14 includes a roller 14a that rotates about a rotation shaft fixed to the upper portion of the partition body 11. The partition body guide mechanism 12 includes a guide rail 18 that guides the roller 14a in such a manner that the roller 14a rolls along the width direction Y. As shown in FIG. 5, in this example, rollers 14a are supported in such a manner as to be rotatable about axes extending along the path direction X in the upper portions of the plurality of door members 15 constituting the partition body 11. The guide rail 18 is configured to guide the plurality of rollers 14a respectively corresponding to the plurality of door members 15 in such a manner that the rollers 14a roll along the width direction Y. With this configuration, the plurality of door members 15 are guided in such a manner as to slide along the width direction Y. In the present embodiment, a plate-like support member 14b that is bent into an L-shape is fixed to the upper portion of each of the three door members 15. More specifically, the support member 14b is fixed to a surface of each door member 15 that faces upward. The roller 14a is supported by an upper portion of the support member 14b so as to be rotatable. With this configuration, each of the first door member 15a, the second door member 15b, and the third door member 15c is suspended from the guide rail 18 of the partition body guide mechanism 12 via the support member 14b and the roller 14a. In the present embodiment, the guide rail 18 is fixed to the ceiling wall portion K2 of the wall body K at the prescribed position T. The three door members 15 are supported with the rollers 14a placed on an upper surface of the guide rail 18. Each of the plurality of rollers 14a rolls along the width direction Y on the upper surface of the guide rail 18. As a result, the plurality of door members 15 constituting the partition body 11 slide along the width direction Y. Note that the guide rail 18 corresponds to a "rail".

In the present embodiment, the partition device 10 further includes the first fixed wall 31, a second fixed wall 32, and the third fixed wall 33 as shown in FIG. 1. In this example, all of these walls have rectangular shapes when viewed in the path direction X. Each of the first fixed wall 31 and the third fixed wall 33 is fixed to the floor surface and a first pillar member 51 that stands in a second side Y2 end portion in the width direction of the internal space 8 at the prescribed position T. Each of the first fixed wall 31 and the third fixed wall 33 is disposed along the width direction Y and the up-down direction Z. Furthermore, the first fixed wall 31 and the third fixed wall 33 are spaced apart from each other in the path direction X. In the illustrated example, the first fixed wall 31 is disposed on the second side X2 in the path direction relative to the third fixed wall 33. In this example, the partition body 11 comes to the retracted position and is accommodated in a partition body accommodation section U formed between the first fixed wall 31 and the third fixed wall 33, as a result of the plurality of door members 15 constituting the partition body 11 sliding toward the second side Y2 in the width direction. In this example, the first door member 15a, the second door member 15b, and the third door member 15c are accommodated in the partition body accommodation section U in a state of overlapping each other and being arranged in the path direction X. Accordingly, the first fixed wall 31 and the third fixed wall 33 are preferably spaced apart from each other in the path direction X by a distance corresponding to the total thickness in the path direction X of the plurality of door members 15 constituting the partition body 11.

The second fixed wall 32 is fixed to the floor surface and a second pillar member 52 that stands in a first side Y1 end portion in the width direction of the internal space 8 at the prescribed position T. The second fixed wall 32 is disposed along the width direction Y and the up-down direction Z. As shown in FIGS. 1 and 3, in the path direction X, the region in which the second fixed wall 32 is disposed overlaps the region in which the third door member 15c of the partition body 11 is disposed. Accordingly, while the partition body 11 is at the protruding position, a surface of the third door member 15c facing the first side Y1 in the width direction abuts against a surface of the second fixed wall 32 facing the second side Y2 in the width direction. With this configuration, the internal space 8 is partitioned by the partition body 11 into the first internal space 8a and the second internal space 8b.

In the partition device 10, the guided portions 14 of the partition body 11 are provided in the upper portion of the partition body 11 as described above. Accordingly, even when the worker R or the like operates a lower portion of the partition body 11 to slide the partition body 11 toward the second side Y2 in the width direction and bring the partition body 11 to the retracted position, there may be cases where the upper portion of the partition body 11 is positioned (remains) on the first side Y1 in the width direction relative to the lower portion due to the partition body 11 warping or inclining, for example.

In such a case, the upper portion of the partition body 11 may protrude toward the aisle and the entire partition body 11 may not be appropriately retracted to the retracted position. Therefore, the partition device 10 includes the movement assist mechanism 13 that assists sliding movement of the partition body 11.

As shown in FIGS. 3, 4, and 5, the movement assist mechanism 13 includes a cable body 19 and a cable body guide mechanism 21 that guides the cable body 19. The cable body 19 and the cable body guide mechanism 21 function to assist sliding movement of the partition body 11 so that the position of the entire partition body 11 can be appropriately changed from the protruding position to the retracted position.

In the present embodiment, the cable body 19 is coupled to the partition body 11 and configured in such a manner that the worker R can slide the partition body 11 in the width direction Y by operating the cable body 19. Note that the cable body 19 in this example is a wire cable.

A coupling portion 20, which is a portion of the cable body 19, is coupled to the upper portion of the partition body 11. In the present embodiment, the coupling portion 20 is an end portion of the cable body 19. Note that the coupling portion 20 is coupled to the third door member 15c constituting the partition body 11 via an elastic body 26, a bracket 45, and the like as described later. In this example, the coupling portion 20 is attached to the partition body 11 in such a manner as to be positioned above the partition body 11.

Also, a grip portion 23 to be gripped by the worker R is provided at a position on the cable body 19 spaced apart from the coupling portion 20. In the present embodiment, the grip portion 23 is provided in an end portion of the cable body 19 that is opposite to the coupling portion 20. The grip portion 23 is gripped when the worker R or the like operates the cable body 19. As described above, in this example, the coupling portion 20 is provided in an end portion of the cable body 19, and the grip portion 23 is provided in the other end portion of the cable body 19.

As shown in FIGS. 3, 4, and 5, the cable body guide mechanism 21 includes a guide body 22 at a fixed position relative to the partition body guide mechanism 12. In the present embodiment, the guide body 22 is disposed at a position that corresponds to the coupling portion 20 in the up-down direction Z and that is on the second side Y2 in the width direction relative to the position of the coupling portion 20 when the partition body 11 is at the retracted position. In the present embodiment, the guide body 22 is a pulley 22A that is supported so as to be rotatable about an axis extending along the path direction X. Also, in the present embodiment, the cable body guide mechanism 21 further includes a pulley support member 21A that supports the pulley 22A, which serves as the guide body 22 (see FIG. 5).

In the outer circumferential surface of the pulley 22A serving as the guide body 22, a region spanning from a portion facing upward to a portion facing the second side Y2 in the width direction guides the cable body 19. That is, an extending direction of the cable body 19 is curved by the guide body 22, and a portion of the cable body 19 that is on the coupling portion 20 side relative to the guide body 22 extends along the width direction Y on the first side Y1 in the width direction relative to the guide body 22, while a portion of the cable body 19 that is on the grip portion 23 side relative to the guide body 22 extends along the up-down direction Z below the guide body 22. Due to this configuration, the worker R can grip the grip portion 23 and operate the cable body 19 at a position below the coupling portion 20 and the guide body 22. Specifically, when the partition body 11 is at the protruding position, the worker R can move the upper portion of the partition body 11 toward the second side Y2 in the width direction by pulling the cable body 19 downward.

As shown in FIG. 5, in the present embodiment, the guide body 22 guides the cable body 19 in such a manner that the cable body 19 extending from the coupling portion 20 toward the second side Y2 in the width direction is curved at the position of the guide body 22 and extends downward therefrom. The portion of the cable body 19 that is on the grip portion 23 side relative to the guide body 22 extends along the up-down direction Z with the grip portion 23 positioned at the lower end.

In the present embodiment, the pulley 22A is supported in such a manner that an upper end portion of the outer circumferential surface of the pulley 22A is disposed at the position corresponding to the coupling portion 20 in the up-down direction Z. In this example, the coupling portion 20 is disposed above the partition body 11 as described above. Accordingly, the upper end portion of the outer circumferential surface of the pulley 22A is also disposed above the partition body 11. Therefore, the portion of the cable body 19 that is on the coupling portion 20 side relative to the guide body 22 extends along the width direction Y above the partition body 11. Also, in the present embodiment, the pulley 22A is supported in such a manner that a second side Y2 end portion in the width direction of the outer circumferential surface of the pulley 22A is disposed in the second side Y2 end portion in the width direction of the internal space 8. In this example, the second side Y2 end portion in the width direction of the outer circumferential surface of the pulley 22A is adjacent to the first pillar member 51. Accordingly, the portion of the cable body 19 that is on the grip portion 23 side relative to the guide body 22 extends along the up-down direction Z in the second side Y2 end portion in the width direction of the internal space 8. In order to realize this configuration, in this example, the pulley support member 21A is fixed to the third fixed wall 33 in such a manner that the rotation axis of the pulley 22A is positioned in an upper end portion of a second side Y2 region in the width direction of the third fixed wall 33.

In the present embodiment, the coupling portion 20 is coupled to the door member 15 that is closest to the first side Y1 in the width direction while the partition body 11 is at the protruding position. In this example, the coupling portion 20 is coupled to the upper portion of the third door member 15c. Accordingly, when the partition body 11 is at the protruding position, the worker R can pull the upper portion of the third door member 15c toward the second side Y2 in the width direction by pulling the grip portion 23 of the cable body 19 downward. Furthermore, since the partition body 11 includes the restriction mechanism 16c, each of the plurality of door members 15 constituting the partition body 11 is prevented from moving toward the first side Y1 in the width direction relative to the protruding side door member as described above. Accordingly, it is possible to slide all of the plurality of door members 15 toward the second side Y2 in the width direction by pulling the third door member 15c, which is closest to the first side Y1 in the width direction among the plurality of door members 15 while the door members 15 are at the protruding position, toward the second side Y2 in the width direction.

As shown in FIG. 5, in the present embodiment, the coupling portion 20 is coupled to the partition body 11 via the elastic body 26. In this example, the elastic body 26 is disposed in such a manner as to exhibit elasticity in the width direction Y. Also, the elastic body 26 is disposed in such a manner as to apply a biasing force to the partition body 11 toward the second side Y2 in the width direction at least while the partition body 11 is at the retracted position. In this example, the elastic body 26 is a compression coil spring. As shown in FIG. 5, in the present embodiment, the coupling portion 20 includes a rod-like coupling member 20a that is provided at a leading end portion of the cable body 19. In this example, the bracket 45 is fixed to the upper surface of the partition body 11, which is the upper surface (surface facing upward when viewed in the up-down direction Z) of the third door member 15c in this example, to couple the coupling portion 20 to the partition body 11. The coupling member 20a extends through the bracket 45 in the width direction Y. A lock member 42 is attached to a portion of the coupling member 20a that is on the first side Y1 in the width direction relative to the bracket 45. The elastic body 26 is sandwiched between the lock member 42 and the bracket 45 in the width direction Y. Here, the coupling member 20a is disposed in such a manner as to extend through the radially inside of the compression coil spring serving as the elastic body 26. The elastic body 26 is disposed in a compressed state between the lock member 42 and the bracket 45 in the width direction Y, and applies a biasing force toward the first side Y1 in the width direction to the lock member 42 and the coupling member 20a, while applying, as a reaction force, a biasing force toward the second side Y2 in the width direction to the bracket 45 and the partition body 11 (the third door member 15c in this example). Also, in the present embodiment, a stopper member 43 is attached to a portion of the coupling member 20a that is on the second side Y2 in the width direction relative to the bracket 45. Accordingly, movement of the coupling member 20a toward the first side Y1 in the width direction relative to the bracket 45, which is caused by the biasing force of the elastic body 26, is restricted and ceases when the stopper member 43 abuts against the bracket 45.

Also, in the present embodiment, when a range of height reachable by a hand of the worker R is referred to as an "operation capable range P", the grip portion 23 is disposed in such a manner as to be within the operation capable range P both while the partition body 11 is at the protruding position and while the partition body 11 is at the retracted position. Here, the operation capable range P refers to a range from the height of the raised hand of the worker R who has a standard height to the floor surface on which the worker R is standing (see FIG. 3). If the grip portion 23 is designed to be within the operation capable range P both while the partition body 11 is at the protruding position and while the partition body 11 is at the retracted position, the worker R can easily operate the grip portion 23. In the present embodiment, a movable range of the grip portion 23 in the up-down direction Z is set in a part of the operation capable range P. Here, a state where the grip portion 23 is at the upper limit of the movable range in the up-down direction Z corresponds to the state where the partition body 11 is at the protruding position. Here, the position of the grip portion 23 in this state will be referred to as a "protruding state grip portion position". Also, a state where the grip portion 23 is at the lower limit of the movable range in the up-down direction Z corresponds to the state where the partition body 11 is at the retracted position. Here, the position of the grip portion 23 in this state will be referred to as a "retracted state grip portion position". As shown in FIG. 5, in this example, when the partition body 11 is at the protruding position, the grip portion 23 is at a height around the stomach of the worker R who is standing, and when the partition body 11 is at the retracted position, the grip portion 23 is at a height around the knees of the worker R. Note that the protruding state grip portion position and the retracted state grip portion position are not limited to these examples, and can be set to suitable positions within the operation capable range P. The worker R can change the position of the partition body 11 from the protruding position to the retracted position by pulling the grip portion 23 downward from the protruding state grip portion position. Note that the worker R may also bring the partition body 11 to the retracted position by directly moving the partition body 11 (the third door member 15c in this example) toward the second side Y2 in the width direction. In this case, if the entire partition body 11 has not been retracted to the retracted position and the upper portion of the partition body 11 protrudes toward the first side Y1 in the width direction, the worker R can bring the entire partition body 11 to the retracted position by pulling the grip portion 23 downward to pull the upper portion of the partition body 11 toward the second side Y2 in the width direction.

In the present embodiment, the partition device 10 includes a first holding bracket 87 that is provided at a position corresponding to the protruding state grip portion position and holds the grip portion 23 at the protruding state grip portion position.

When the partition body 11 is at the protruding position, the grip portion 23 can be held by the first holding bracket 87 so as not to swing. In this example, the first holding bracket 87 is fixed to the first pillar member 51. Also, in this example, the first holding bracket 87 includes a first holding portion 87a that has a plate-like shape, extends horizontally, and includes a notch into which the cable body 19 can be inserted from any side in the horizontal direction. The first holding bracket 87 is configured in such a manner that the grip portion 23 abuts against the lower surface of the holding portion in the state where the cable body 19 has been inserted into the notch. Note that the grip portion 23 abuts against the lower surface of the holding portion due to the elastic force of the above-described elastic body 26, and thus the grip portion 23 is held by the first holding bracket 87.

Also, as shown in FIG. 5, the present embodiment includes a holding mechanism 84 that holds the grip portion 23 at the retracted state grip portion position at which the grip portion 23 is placed while the partition body 11 is at the retracted position. The grip portion 23 is held by the holding mechanism 84 so as not to move upward from the retracted state grip portion position. Therefore, it is possible to avoid a situation in which the partition body 11 moves unintendedly from the retracted position toward the first side Y1 in the width direction and obstructs movement of the transport units 4 or interferes with the transport units 4. The holding mechanism 84 is provided at a position corresponding to the grip portion 23 placed at the retracted state grip portion position. In the present embodiment, the grip portion 23 includes a female screw portion 24 that extends along the up-down direction Z from a lower end portion of the grip portion 23. Also, the holding mechanism 84 includes a second bracket 84a, a fastening bolt 84b, and a fixing nut 84c. The second bracket 84a includes a second holding portion 84d that has a plate-like shape, extends horizontally, and includes a through hole (not shown) extending in the up-down direction Z. The fastening bolt 84b is inserted into a through hole of the second holding portion 84d in such a manner that a head portion of the fastening bolt 84b is on the lower side. The fixing nut 84c is fixed to the fastening bolt 84b in such a manner as to abut against the second holding portion 84d from above. With this configuration, it is possible to hold the fastening bolt 84b in such a manner as to be rotatable relative to the second bracket 84a and kept from falling off from the second bracket 84a. Here, the fastening bolt 84b is configured to be capable of being screwed into the female screw portion 24 of the grip portion 23. By screwing the fastening bolt 84b into the female screw portion 24 of the grip portion 23 at the retracted state grip portion position from below, it is possible to hold the grip portion 23 at the retracted state grip portion position. In the illustrated example, a nob 86 is provided on the head portion of the fastening bolt 84b to make it easy for the worker R to rotate the fastening bolt 84b by hand. The diameter of the nob 86 is sufficiently larger than the diameter of the shaft portion of the fastening bolt 84b, and the outer circumferential portion of the nob 86 is provided with anti-slipping means (e.g., has a shape including recessed portions and protruding portions). The worker R can easily rotate the fastening bolt 84b by gripping and rotating the nob 86. Note that in this example, the second bracket 84a is fixed to the first pillar member 51.

As shown in FIG. 5, in the present embodiment, the holding mechanism 84 includes an adjusting mechanism 85 that adjusts the position in the up-down direction Z at which the grip portion 23 is held. As shown in FIG. 5, in this example, the fastening bolt 84b of the holding mechanism 84 also serves as the adjusting mechanism 85. That is, it is possible to adjust the position in the up-down direction Z of the grip portion 23 held by the holding mechanism 84 by rotating the fastening bolt 84b whose position in the up-down direction Z is restricted by the second bracket 84a and changing the length by which the fastening bolt 84b is screwed into the female screw portion 24 of the grip portion 23. As described above, the nob 86 is provided on the head portion of the fastening bolt 84b, and therefore, the worker R can easily adjust the position in the up-down direction Z at which the grip portion 23 is held by gripping the nob 86 and rotating the fastening bolt 84b. By adjusting the position in the up-down direction Z at which the grip portion 23 is held by the holding mechanism 84 as described above, it is possible to adjust the amount or force by which the partition body 11 is pulled toward the retracting direction via the cable body 19. Here, the coupling portion 20 is coupled to the partition body 11 via the elastic body 26 as described above. Accordingly, it is possible to adjust the compression amount of the elastic body 26 and the biasing force with which the partition body 11 is biased by the elastic body 26 toward the retracting direction by adjusting the position of the grip portion 23 in the up-down direction Z. Therefore, unintended movement of the partition body 11 from the retracted position toward the first side Y1 in the width direction can be avoided more reliably.

Also, as shown in FIG. 5, in the present embodiment, a display region S that has at least either a different color or a different pattern from that of the other portion of the partition body 11 is provided in a portion of the partition body 11 extending along the edge on the first side Y1 in the width direction, on at least one of the surfaces of the upper portion of the partition body 11 facing opposite sides in the path direction X.

In this example, the display region S is provided in portions extending along the edge on the first side Y1 in the width direction on both of the surfaces of the upper portion of the partition body 11 respectively facing the first side X1 and the second side X2 in the path direction. More specifically, the display region S is provided in portions extending along the edge on the first side Y1 in the width direction on both of the surfaces of the upper portion of the third door member 15c respectively facing the first side X1 and the second side X2 in the path direction. In this example, both the color and the pattern of the display region S differ from those of the other portion. It is desirable that the color and the pattern of the display region S are conspicuous as far as possible. In the illustrated example, the display region S has an inclined stripe pattern of two colors. In order to make the display region S conspicuous, the display region S preferably has red and white stripes, for example. Note that the color and the pattern of the display region S are not limited to these examples. For example, a configuration is also possible in which only the color of the display region S differs from that of the other portion. In such a case as well, the display region S can sufficiently exhibit its function if the display region S has a bright conspicuous color. The display region S has a function of making it easy to confirm whether or not the partition body 11 has been appropriately retracted to the retracted position by checking how the display region S looks when the worker R views the partition body 11 in the path direction X. That is, when the entire partition body 11 has been appropriately retracted to the retracted position, the entire partition body 11 is accommodated in the partition body accommodation section U formed between the first fixed wall 31 and the third fixed wall 33. Accordingly, the entire display region S is also accommodated in the partition body accommodation section U, and the worker R cannot see the display region S when viewing the partition body 11 in the path direction X. However, there are cases where even when the partition body 11 is brought to the retracted position, the upper portion of the partition body 11 protrudes from the partition body accommodation section U toward the first side Y1 in the width direction due to the upper portion of the partition body 11 warping or inclining, for example. In such a case, a portion of the display region S protrudes toward the aisle 5 as shown in FIG. 6, for example, and the worker R can see the display region S when viewing the partition body 11 in the path direction X. As described above, the worker R can easily confirm whether or not the partition body 11 has been appropriately retracted to the retracted position based on whether or not the display region S can be seen.

6. Other Embodiments

Next, other embodiments of the article storage facility will be described.

In the above embodiment, a configuration is described as an example in which the transport device 3 includes two transport units 4 (the first transport unit 4a and the second transport unit 4b) and the partition body 11 is provided in such a manner as to separate movable ranges of these two transport units 4. However, there is no limitation to this configuration, and the transport device 3 may also include three or more transport units 4, for example. In such a case, it is preferable to set two prescribed positions T and provide two partition bodies 11 to separate movable ranges of the three transport units 4.

(2) In the above embodiment, a configuration is described as an example in which the second bracket 84a, the fastening bolt 84b, and the fixing nut 84c constituting the holding mechanism 84 also serve as the adjusting mechanism 85. However, there is no limitation to this configuration, and the adjusting mechanism 85 may be provided separately from the holding mechanism 84. For example, the adjusting mechanism 85 may be provided in the cable body 19 or the grip portion 23. In such a case, it is preferable that the adjusting mechanism 85 includes a mechanism for adjusting the length of the cable body 19.

(3) In the above embodiment, a configuration is described as an example in which the coupling portion 20 is coupled to the upper portion of the third door member 15c via the elastic body 26. However, there is no limitation to this configuration, and a configuration is also possible in which the elastic body 26 is not provided and the coupling portion 20 is fixed to the partition body 11, for example.

(4) In the above embodiment, a configuration is described as an example in which the partition body 11 includes three door members 15 (the first door member 15a, the second door member 15b, and the third door member 15c). However, the number of door members 15 constituting the partition body 11 can be set as appropriate. Accordingly, the number of door members 15 included in the partition body 11 may be four or more or two or less. Alternatively, the partition body 11 may also be constituted by a single door member 15. It is preferable to set the number of door members 15 constituting the partition body 11 as appropriate according to the size of the article storage facility 9, in particular, the width of the aisle 5 in the width direction Y, for example.

(5) In the above embodiment, a configuration is described as an example in which a single roller 14a is provided for each of the plurality of door members 15. However, there is no limitation to this configuration, and a plurality of rollers 14a may also be provided for each of the plurality of door members 15.

(6) In the above embodiment, a configuration is described as an example in which the display region S is provided on both surfaces of the upper portion of the partition body 11 respectively facing the first side X1 and the second side X2 in the path direction. However, there is no limitation to this configuration, and a configuration is also possible in which the display region S is provided only on a surface of the upper portion of the partition body 11 facing either the first side X1 or the second side X2 in the path direction. For example, in a case where an entrance from which the worker R enters the internal space 8 is provided on one side in the path direction X relative to the prescribed position T, it is preferable to provide the display region S on the surface of the upper portion of the partition body 11 facing that side in the path direction X. Note that a configuration is also possible in which the display region S is not provided in the partition body 11. In such a case, it is also preferable to provide a sensor that detects whether or not the upper portion of the partition body 11 is appropriately placed at the retracted position, for example.

(7) Note that configurations disclosed in each of the embodiments described above can be applied in combination with configurations disclosed in other embodiments, as long as no contradiction arises. Regarding the other configurations as well, the embodiments disclosed in the present specification are merely examples in all respects. Accordingly, various modifications can be made as appropriate within a scope that does not depart from the gist of this disclosure.

7. Summary of Embodiments

The following describes an overview of the article storage facility described above.

An article storage facility including: a pair of storage racks disposed on opposite sides of an aisle; and a transport device configured to move along the aisle and transport an article, wherein the transport device includes two transport units, each of the two transport units includes: a cart configured to travel along a traveling path set along the aisle; a support fixed to the cart; an elevation body configured to ascend and descend along the support; and a transfer device supported by the elevation body and configured to hold the article and transfer the article to the storage racks, the article storage facility further includes a partition device configured to partition the aisle, at a prescribed position in an intermediate portion of the traveling path, the partition device includes: a partition body configured to slide along a width direction to move to a protruding position at which the partition body protrudes into the aisle and a retracted position at which the partition body is retracted from the aisle, the width direction being a direction orthogonal to, when viewed in an up-down direction, a path direction extending along the traveling path; a partition body guide mechanism configured to support the partition body and guide the sliding movement of the partition body; and a movement assist mechanism configured to assist the sliding movement of the partition body, the partition body includes, in an upper portion, a guided portion configured to be guided by the partition body guide mechanism in the width direction, the movement assist mechanism includes: a cable body; and a cable body guide mechanism configured to guide the cable body, the cable body includes a coupling portion coupled to the upper portion of the partition body, the cable body further includes a grip portion to be gripped by a worker, at a position on the cable body spaced apart from the coupling portion, the cable body guide mechanism includes a guide body at a fixed position relative to the partition body guide mechanism, the cable body extends along an extending direction that is curved along the guide body, a portion of the cable body that is on a coupling portion side relative to the guide body extending along the width direction on a protruding side in the width direction relative to the guide body, and a portion of the cable body that is on a grip portion side relative to the guide body extending along the up-down direction below the guide body, the protruding side in the width direction being a side toward which the partition body moves when moving from the retracted position toward the protruding position, and the grip portion is in an operation capable range both while the partition body is at the protruding position and while the partition body is at the retracted position, the operation capable range being a range of height reachable by a hand of the worker.

According to this configuration, the article storage facility includes the partition device including the partition body whose position changes between the protruding position at which the partition body protrudes into the aisle and the retracted position at which the partition body is retracted from the aisle. Accordingly, when the partition body is at the protruding position, the aisle can be partitioned at the prescribed position to independently operate the transport units in respective spaces or independently perform maintenance operations or the like in the respective spaces. Also, when the partition body is at the retracted position, a single transport unit can travel past the prescribed position.

In this partition device, the guided portion that is guided by the partition body guide mechanism in the width direction is provided in the upper portion of the partition body. Accordingly, even when the worker or the like operates a lower portion of the partition body to slide the partition body toward a retracting side in the width direction and bring the partition body to the retracted position, there may be cases where the upper portion of the partition body is positioned on the protruding side in the width direction relative to the lower portion due to the partition body warping or inclining, for example. In such a case, the upper portion of the partition body may protrude toward the aisle and the entire partition body may not be appropriately retracted to the retracted position. Such a situation is likely to occur particularly when the partition body has a large length in the up-down direction.

According to this configuration, when moving the partition body to the retracted position, the worker can pull the upper portion of the partition body, to which the coupling portion of the cable body is coupled, toward the retracting side in the width direction by pulling the grip portion downward. Therefore, the entire partition body can be appropriately retracted from the aisle irrespective of the length of the partition body in the up-down direction. Moreover, the grip portion is in the operation capable range both while the partition body is at the retracted position and while the partition body is at the protruding position, and therefore, the worker can easily operate the grip portion.

As described above, according to this configuration, when moving the partition body to the retracted position at which the partition body is retracted from the aisle, it is possible to appropriately retract the entire partition body from the aisle irrespective of the length of the partition body in the up-down direction.

Here, it is preferable that the article storage facility includes a holding mechanism configured to hold the grip portion at a retracted state grip portion position at which the grip portion is placed when the partition body is at the retracted position, and the holding mechanism includes an adjusting mechanism configured to adjust a position in the up-down direction at which the grip portion is held.

According to this configuration, the grip portion can be held at the retracted state grip portion position by the holding mechanism. Accordingly, the partition body can be stationarily held at the retracted position and can be kept from moving to the protruding position by mistake. Moreover, since the holding mechanism includes the adjusting mechanism, it is possible to adjust the amount or force by which the partition body is pulled toward the retracting direction via the cable body by adjusting the position in the up-down direction at which the grip portion is held.

Also, it is preferable that the coupling portion is coupled to the partition body via an elastic body.

According to this configuration, even if the grip portion is suddenly operated by the worker, the elastic body can mitigate transmission of the operation. Therefore, it is possible to avoid a situation in which an excessive load is applied to the cable body, the cable body guide mechanism, the partition body, the partition body guide mechanism, and the like.

Also, it is possible to always apply a force that pulls the partition body toward the retracting side via the cable body and the elastic body by fixing the position of the grip portion in a state where the elastic body is stretched to be longer than its equilibrium length. Accordingly, even when the cable body has been elongated with the passage of time, for example, it is possible to absorb the increase in the length of the cable body and appropriately hold the partition body at the retracted position.

Also, it is preferable that the partition body includes a plurality of plate-like door members, the plurality of door members are disposed in parallel to each other and guided by the partition body guide mechanism in such a manner as to be capable of performing the sliding movement at respective positions shifted from each other in the path direction, the plurality of door members are coupled to each other via a linear motion guide mechanism in such a manner as to be movable relative to each other in the width direction, while the partition body is at the protruding position, the plurality of door members overlap each other in the width direction a smaller amount than while the partition body is at the retracted position, and the coupling portion is coupled to a door member among the door members that is closest to the protruding side in the width direction while the partition body is at the protruding position.

According to this configuration, it is possible to bring the partition body to the protruding position by drawing out the plurality of door members and bring the partition body to the retracted position by overlapping the plurality of door members. Accordingly, it is possible to reduce the length in the width direction of a space required for accommodating the partition body at the retracted position, while securing the length in the width direction of the partition body at the protruding position. Furthermore, since the coupling portion is coupled to the door member that is closest to the protruding side in the width direction while the partition body is at the protruding position, the worker can appropriately retract the entire partition body, namely, all of the plurality of door members to the retracted position by pulling the grip portion downward.

It is also preferable that the guided portion includes a roller configured to rotate about a rotation shaft fixed to the upper portion of the partition body, and the partition body guide mechanism includes a rail configured to guide the roller in such a manner that the roller rolls along the width direction.

According to this configuration, it is possible to appropriately slide the partition body along the rail.

It is also preferable that a display region that has at least either a different color or a different pattern from that of another portion of the partition body is provided in a portion of the partition body extending along an edge on the protruding side in the width direction on at least one of surfaces of the upper portion of the partition body facing opposite sides in the path direction.

According to this configuration, the worker can easily confirm whether or not the partition body has been appropriately retracted to the retracted position by checking how the display region looks when the partition body is viewed in the path direction.

INDUSTRIAL APPLICABILITY

The technology according to the present disclosure can be used for article storage facilities.

What is claimed is:
1. An article storage facility comprising:
a pair of storage racks disposed on opposite sides of an aisle; and
a transport device configured to move along the aisle and transport an article,
wherein:
the transport device comprises two transport units,
each of the two transport units comprises:
a cart configured to travel along a traveling path set along the aisle;
a support fixed to the cart;
an elevation body configured to ascend and descend along the support; and
a transfer device supported by the elevation body and configured to hold the article and transfer the article to the storage racks,
the article storage facility further comprises a partition device configured to partition the aisle, at a prescribed position in an intermediate portion of the traveling path,
the partition device comprises:
a partition body configured to slide along a width direction to move to a protruding position at which the partition body protrudes into the aisle and a retracted position at which the partition body is retracted from the aisle, and the width direction is a direction orthogonal to, when viewed in an up-down direction, a path direction extending along the traveling path;
a partition body guide mechanism configured to support the partition body and guide the sliding movement of the partition body; and
a movement assist mechanism configured to assist the sliding movement of the partition body,
the partition body comprises, in an upper portion, a guided portion configured to be guided by the partition body guide mechanism in the width direction,
the movement assist mechanism comprises:
a cable body; and
a cable body guide mechanism configured to guide the cable body,
the cable body comprises a coupling portion coupled to the upper portion of the partition body, the cable body further comprises a grip portion to be gripped by a worker, at a position on the cable body spaced apart from the coupling portion, the cable body guide mechanism comprises a guide body at a fixed position relative to the partition body guide mechanism, the cable body extends along an extending direction that is curved along the guide body, a portion of the cable body that is on a coupling portion side relative to the guide body extending along the width direction on a protruding side in the width direction relative to the guide body, and a portion of the cable body that is on a grip portion side relative to the guide body extending along the up-down direction below the guide body, the protruding side in the width direction is a side toward which the partition body moves when moving from the retracted position toward the protruding position, and the grip portion is in an operation capable range both while the partition body is at the protruding position and while the partition body is at the retracted position, the operation capable range is a range of height reachable by a hand of the worker.

2. The article storage facility according to claim 1, further comprising:

a holding mechanism configured to hold the grip portion at a retracted state grip portion position at which the grip portion is placed when the partition body is at the retracted position, and wherein the holding mechanism comprises an adjusting mechanism configured to adjust a position in the up-down direction at which the grip portion is held.

3. The article storage facility according to claim 1, wherein the coupling portion is coupled to the partition body via an elastic body.

4. The article storage facility according to claim 1, wherein:

the partition body comprises a plurality of plate-like door members, the plurality of door members is disposed in parallel to each other and guided by the partition body guide mechanism to be capable of performing the sliding movement at respective positions shifted from each other in the path direction, the plurality of door members are coupled to each other via a linear motion guide mechanism to be movable relative to each other in the width direction, while the partition body is at the protruding position, the plurality of door members overlap each other in the width direction a smaller amount than while the partition body is at the retracted position, and the coupling portion is coupled to a door member of the door members that is closest to the protruding side in the width direction while the partition body is at the protruding position.

5. The article storage facility according to claim 1, wherein the guided portion comprises a roller configured to rotate about a rotation shaft fixed to the upper portion of the partition body, and wherein the partition body guide mechanism comprises a rail configured to guide the roller in such a manner that the roller rolls along the width direction.

6. The article storage facility according to claim 1, wherein a display region that has at least either a different color or a different pattern from that of another portion of the partition body is provided in a portion of the partition body extending along an edge on the protruding side in the width direction on at least one of surfaces of the upper portion of the partition body facing opposite sides in the path direction.

* * * * *